United States Patent [19]

Sekiya et al.

[11] Patent Number: 4,997,886

[45] Date of Patent: Mar. 5, 1991

[54] FLUORINE-CONTAINING POLYMERIC COMPOUND AND METHOD FOR THE PREPARATION THEREOF

[75] Inventors: Akira Sekiya; Masanori Tamura, both of Tsukuba, Japan

[73] Assignee: Japan as represented by Director General of Agency of Industrial Science and Technology, Tokyo, Japan

[21] Appl. No.: 486,745

[22] Filed: Mar. 1, 1990

[30] Foreign Application Priority Data

Mar. 3, 1989 [JP] Japan .................................. 1-52655

[51] Int. Cl.$^5$ .............................................. C08F 8/34
[52] U.S. Cl. .................................. 525/128; 525/328.2; 525/352; 526/243
[58] Field of Search ........................... 525/128, 328.2; 526/243

[56] References Cited

U.S. PATENT DOCUMENTS

| | | | |
|---|---|---|---|
| 2,600,414 | 6/1952 | Mast et al. | 525/328.2 |
| 4,299,932 | 11/1981 | Hergenrother et al. | 525/328.2 |
| 4,426,489 | 1/1984 | Wessling et al. | 525/328.2 |
| 4,464,511 | 8/1984 | Naarmann et al. | 525/328.2 |
| 4,524,185 | 6/1985 | Hinderer | 525/328.2 |

*Primary Examiner*—Bernard Lipman
*Attorney, Agent, or Firm*—Wyatt, Gerber, Burke and Badie

[57] ABSTRACT

A novel fluorine-containing polymeric compound represented by the general formula —CH$_2$—CH(CH$_2$—NH$_2$)]$_{m-n}$—CH$_2$—CH(CH$_2$—NH—CS—NH—Pn—OCH$_2$Rf)]$_n$, in which Rf is a perfluoroalkyl group having 6 to 15 carbon atoms, Pn is a 1,2- or 1,4-phenylene group, m is a positive integer in the range from 10 to 1500, n is a positive integer not exceeding m, is prepared by the reaction of one mole of a polyallylamine of the formula —CH$_2$—CH(CH$_2$—NH$_2$)]$_m$, in which m has the same meaning as defined above, with n moles of a 2- or 4-(perfluoroalkylmethoxy)phenyl isothiocyanate represented by the general formula RfCH$_2$O—Pn—NCS.

in which Rf and Pn each have the same meaning as defined above. Despite the high fluorine content, the polymer is soluble in at least one kind of organic solvents so that Langmuir-Blodgett's films can be prepared from a solution of the polymer. The LB films have an extremely low surface energy and useful as a material for protection and modification of various surfaces.

3 Claims, 1 Drawing Sheet

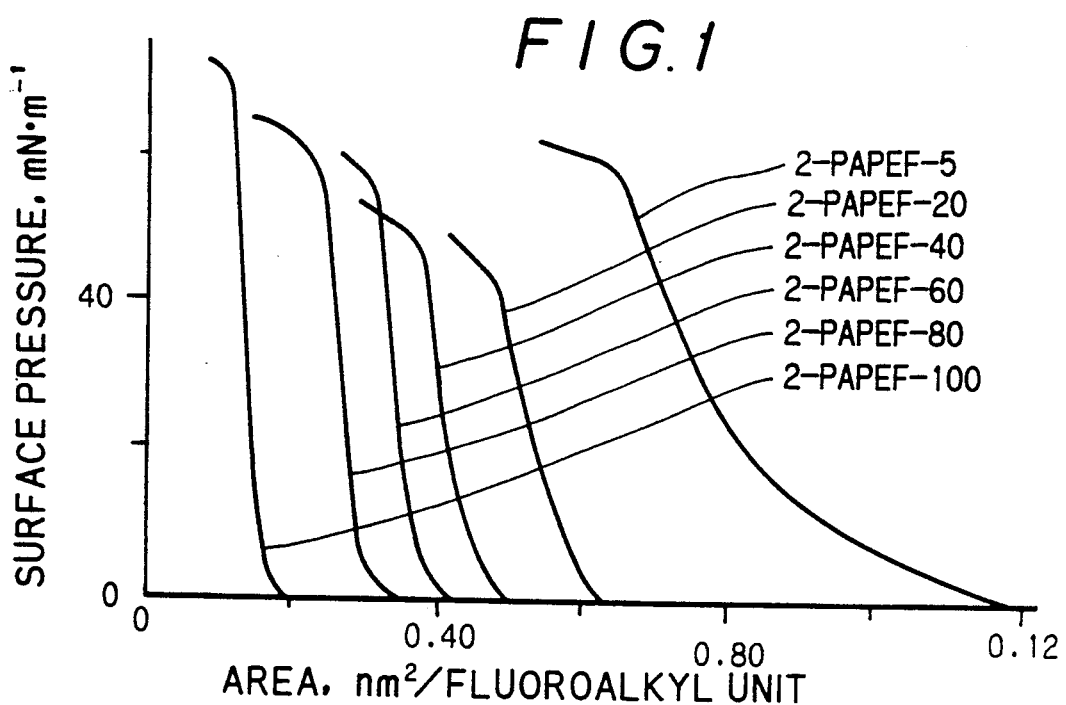
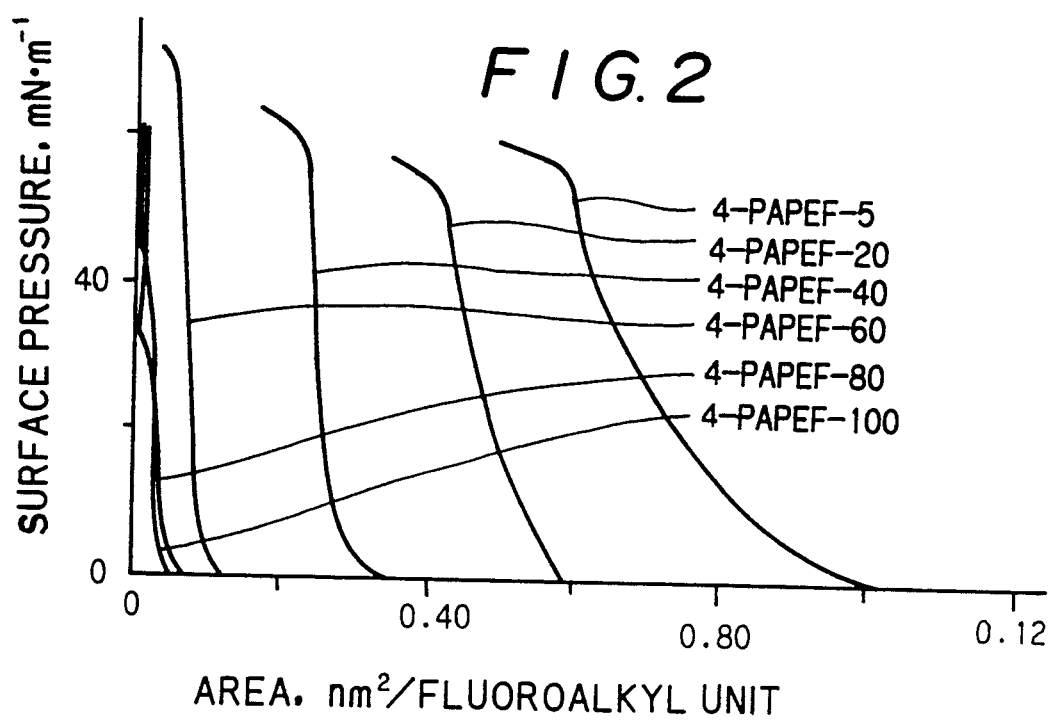

FLUORINE-CONTAINING POLYMERIC COMPOUND AND METHOD FOR THE PREPARATION THEREOF

BACKGROUND OF THE INVENTION

The present invention relates to a novel fluorine-containing polymeric compound which is useful as a material of Langmuir-Blodgett's films as well as to a method for the preparation of such a fluorine-containing polymeric compound.

It is known that polymeric compounds modified with long-chain perfluoroalkyl groups have excellent properties such as water- and oil-repellency, insusceptibility to dust deposition, corrosion resistance and the like so that they are used, for example, for protection and surface modification of electronic circuit boards. Further, they are promising as a material of oxygen-permeable membranes having improved selectivity for the permeation of oxygen relative to other gases by virtue of the high affinity of the perfluoroalkyl groups to oxygen.

A problem in the use of such a polymeric compound having perfluoroalkyl groups introduced into the molecular structure is that the polymer is hardly soluble in solvents due to the water- and oil repellency inherent in the perfluoroalkyl groups so that fluorine-containing polymers are generally not handleable as a material of thin films. In other words, fluorine-containing polymeric compounds can be shaped only with great difficulties into an extremely thin film as an essential element when the polymer is used as a material for surface modification or protection of boards. While it is important that the perfluoroalkyl groups as the functional groups for the oil- and water-repellency and other useful surface properties are oriented toward the surface of the polymeric material in order that the desired performance of surface modification and oxygen permeation can be fully exhibited, a general understanding is that control of such an orientation of polymeric molecules is far from possibility.

One of the inventors has been successful in preparing an ultra-thin film of a controlled molecular orientation by the Langmuir-Blodgett's method from a polyallylamine or polyvinylamine modified with perfluoroalkyl groups as bonded through an amide linkage (see, for example, Japanese Patent Kokai 63-170405. These perfluoroalkyl-modified polyallylamines or polyvinylamines, however, are still not quite satisfactory because the polymer in a solution is subject to gradual hydrolysis of the amide linkages and difficulties are encountered in the handling thereof due to the low solubility of the modified polymer in a solvent.

SUMMARY OF THE INVENTION

The inventors accordingly have continued extensive investigations with an object to develop a method for the preparation of an extremely thin film of a fluorine-containing polymeric compound by utilizing the water-repellency or hydrophobicity of the perfluoroalkyl groups and, as a result, arrived at a discovery that a fluorine-containing polymeric compound quite satisfactory as a material of extremely thin films in respect of the relatively large solubility in organic solvents and stability in an organic solvent against hydrolysis can be obtained when 2- or 4-(perfluoroalkyl-substituted methoxy)phenyl groups are bonded to a part or all of the amino groups in a Polyallylamine through a thiourea linkage -NH-CS-NH- to provide perfluoroalkyl-containing pendant groups.

Thus, the present invention completed on the basis of the above mentioned discovery provides a fluorine-containing polymeric compound which is a novel compound having a structure represented by the general formula

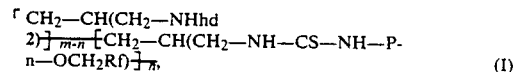

in which Rf is a perfluoroalkyl group having 6 to 15 carbon atoms, Pn is a 1,2- or 1,4-phenylene group, m is a positive integer in the range from 10 to 1500, n is a positive integer not exceeding m.

The fluorine-containing polymeric compound of the general formula (I) can be prepared by the reaction of one mole of a polyallylamine expressed by the formula

in which m has the same meaning as defined above, with n moles of a 2- or 4-(perfluoroalkylmethoxy)phenyl isothiocyanate represented by the general formula

in which Rf and Pn each have the same meaning as defined above.

The above defined fluorine-containing polymeric compound of the invention has good solubility in organic solvents to give a solution, from which an LB film, which means a thin film of a monomolecular layer or accumulated multilayer prepared by the well known Langmuir-Blodgett's method, can be readily prepared.

BRIEF DESCRIPTION OF THE DRAWING

FIGS. 1 and 2 each illustrates an F-A isotherm of the LB films prepared from the inventive fluorine-containing polymeric compounds of the general formula (I) with 2- and 4-(perfluoroalkylmethoxy)phenyl groups, respectively.

DETAILED DESCRIPTION OF THE PREFERRED EMBODIMENTS

As is described above, the fluorine-containing polymeric compound of the invention represented by the general formula (I) can be prepared by the reaction of a polyallylamine of the general formula (II) with a 2- or 4-(perfluoroalkyl-methoxy)phenyl isothiocyanate of the general formula (III). The polyallylamine as the starting material of the reaction can be obtained by neutralizing a polyallylamine hydrochloride with a basic compound. The perfluoroalkyl group denoted by Rf in the general formula (I) has 6 to 15 carbon atoms. This is because the water- and oil-repellency of the polymer can be obtained only when the perfluoroalkyl group has 6 or more carbon atoms while the polymer is less soluble in an organic solvent when the perfluoroalkyl group has an excessively large number of carbon atoms. Further, the degree of polymerization of the polymer denoted by m in the general formula (I) should be in the range from 10 to 1500 because no LB films can be prepared with stability when the degree of polymerization of the polymer is too low while a polymer having an excessively large degree of polymerization is less soluble in an organic solvent.

The above mentioned reaction is performed, preferably, by adding the 2- or 4-(perfluoroalkylmethoxy)phenyl isothiocyanate into a solution of the polyallylamine in a reaction medium, which is preferably a mixture of an alcohol and benzene, at a temperature in the range from 5 to 50° C. or, preferably, from 15 to 30° C. The solution of the polyallylamine preferably has a concentration of about 2 to 10 g/liter. The degree of modification, i.e. the ratio of n:m in the general formula (I), of the polyallylamine with the perfluoroalkyl groups bonded through the thiourea linkages can be controlled by suitably selecting the amount of the 2- or 4-(perfluoroalkylmethoxy)phenyl isothiocyanate relative to the polyallylamine. The reaction is complete usually within several minutes to several hours under agitation of the reaction mixture. After completion of the reaction, the reaction mixture is freed from the solvent by evaporation and the residue is washed with water and dried to give a fluorine-containing polymeric product which can be identified by the chemical analysis for the fluorine content and infrared absorption spectrophotometry to be the polymer expressed by the general formula (I).

The polymer is soluble in several organic solvents and the solution can be spread over a water surface to form a monomolecular layer from which an LB film can be easily prepared. Measurement of the F-A isotherms give a conclusion that an increase in the degree of modification, in each of the 2- and 4-isomers of the isothiocyanate compounds, facilitates preparation of an ultra-thin film in which a single perfluoroalkyl-containing pendant group occupies a decreased area. When the degree of modification with the 2-isomer is 100% or the degree of modification with the 4-isomer is 60% or higher, the area occupied by a single perfluoroalkyl-containing pendant group is smaller than the value of 0.28 nm$^2$, which is the cross sectional area of a perfluoroalkyl group. This fact indicates that the perfluoroalkyl-containing pendant groups are folded in multifold overlapping in the thin film.

When the degree of modification with the 4-isomer is 80% or higher, several different values of the intrinsic area are taken by the pendant groups indicating that the alignment of the perfluoroalkyl-containing pendant groups are subject to variation depending on the degree of modification.

An LB film was prepared by taking up a single layer or a plural number of the layers spread over a water surface on a glass plate and the film thickness and the critical surface tension $\gamma c$ of the film in dyn/cm relative to n-alkanes were determined. The results were that the value of $\gamma c$ for the LB film prepared from the 2-isomer of the isothiocyanate compound was about 20 dyn/cm when the degree of modification was 5% while the value of $\gamma c$ decreased as the degree of modification increased to reach and level off at about 16 dyn/cm when the degree of modification was 40%. In the LB films prepared from the 4-isomer of the isothiocyanate compound, the value of $\gamma c$ was about 18 dyn/cm when the degree of modification was 5% and the value was decreased as the degree of modification was increased reaching about 10 dyn/cm when the degree of modification was 40% while the value was again increased to reach and level off at about 14 to 22 dyn/cm as the further increased degree of modification was 60% or higher.

The above mentioned values of $\gamma c$ in dyn/cm are considerably close to the value 18.5 dyn/cm on a poly(tetrafluoroethylene) resin indicating that the surface energy of the films is considerably low. In particular, the value of $\gamma c$ on the films prepared from the 4-isomer of the isothiocyanate compound is still smaller than on the previously reported perfluoroalkyl-modified polyvinylamine or polyallylamine. This fact suggests that the perfluoroalkyl group bonded through an ether linkage has high freedom of rotation around the ether linkage so as to contribute to a great decrease in the surface energy. Thus, the films obtained in this manner exhibit excellent water- and oil-repellency and insusceptibility to the deposition of dusts. It was notes in the preparation of the LB films of the perfluoroalkyl-modified polymers prepared from the 4-isomer of isothiocyanate compound, of which the degree of modification was 20% and 40%, that difficulties were encountered in the taking up of the second and following layers from the water surface on to the glass plate. This is presumably due tot he extreme slipperiness of the film surface as a consequence of the upright alignment of the perfluoroalkyl groups on the film surface.

The thickness of the LB films per single layer can be determined in two ways by using a Talystep or by the X-ray diffractometry to give a value of about 2 to 4 nm for the polymers having a degree of modification of 80% or lower with the 2-isomer of the isothiocyanate compound and having a degree of modification of 40% or lower with the 4-isomer of the isothiocyanate compound while the value is increased to about 6 nm or larger when the degree of modification is 100% with the 2-isomer or 60% with the 4-isomer of the isothiocyanate compound presumably due to the overlapping disposition of the (perfluoroalkylmethoxy)phenyl groups to increase the film thickness. Thus, it is possible to freely control the film thickness by adjusting the degree of modification of the polyallylamine with the 2- or 4-(perfluoroalkylmethoxy)phenyl-containing pendant groups which in turn can be controlled by adjusting the amount of the perfluoroalkyl-containing reactant, i.e. 2- or 4-(perfluoro-akylmethoxy)phenyl isothiocyanate, relative to the polyallylamine.

The perfluoroalkyl-containing polymer of the invention is soluble in at least one organic solvent so that an LB film of an extremely small film thickness can be prepared from the solution. The area occupied by a single perfluoroalkyl-containing pendant group in the thus prepared thin film can be controlled by changing the degree of modification by selecting the isomeric position of substitution of the perfluoroalkylmethoxy group on the benzene ring.

The perfluoroalkyl groups are standing on the thus prepared LB film of the inventive polymer to exhibit an extremely low surface energy which can be controlled by adequately selecting the degree of modification with the perfluoroalkyl-containing pendant groups and the isomeric position of the perfluoroalkylmethoxy group on the benZene ring to have a possibility that the critical surface tension $\gamma c$ may have a value ranging from a somewhat larger value than that of poly(tetrafluoroethylene) resins to an extremely small value of about 10 dyn/cm. Such a small value of the surface energy has never been obtained in the prior art on a thin film prepared from a polymer modified with a perfluoroalkyl group bonded to the benzene ring through a covalent bond by the Langmuir-Blodgett's method to control the intramolecular and intermolecular orientations.

In the following, the fluorine-containing polymer of the invention and the method for the preparation thereof are described in more detail by way of examples.

EXAMPLE 1.

A methyl alcohol solution of sodium methylate was prepared by adding 115 mg of metallic sodium to 10 ml of methyl alcohol and, when evolution of hydrogen gas from the solution had ceased, 467 mg of a polyallylamine hydrochloride having an average molecular weight of about 9000 corresponding to an average degree of polymerization of about 100 were added to the solution and stirred in a covered reaction vessel. The precipitates of sodium chloride were removed from the reaction mixture by filtration. The filtrate which was a solution of the free polyallylamine was admixed with 10 ml of methyl alcohol and 5 ml of benzene. The thus diluted solution of the polyallylamine was then admixed at one time with a solution of 134 mg of 2-(perfluoroheptylmethoxy)phenyl isothiocyanate dissolved in a solvent mixture of 4 ml of methyl alcohol and 1 ml of benzene and agitated for 30 minutes at room temperature. The resultant solution was clear and could be used as such as a master solution of the polymer for the preparation of an LB film.

The solvents in the solution were removed by evaporation to dryness under a reduced pressure and the residue was washed with water and dried to give a product which was a polyallylamine having the 2-(perfluoroheptylmethoxy)phenyl groups bonded to the polyallylamine molecules through the thiourea linkages in a degree of modification of 5%. The infrared absorption spectrum of the thus obtained polymer product had a strong absorption band in the wave number region of 1300 to 1100 cm$^{-1}$ assignable to the carbon-fluorine linkages from which substitution of the fluoroalkyl-containing pendant groups could be confirmed.

Substantially the same synthetic procedure as above was applicable to the preparation of the modified polymers in which the degree of modification with the perfluoroalkyl-containing pendant groups was higher than 5% or the reactant isothiocyanate was the 4 isomer in place of the 2-isomer. Thus, the synthetic procedure with some modification of the reaction conditions was undertaken to prepare perfluoroalkyl-modified polyallylamine polymers having degrees of modification of 5%, 20%, 40%, 60%, 80% and 100%, of which the pendant groups were 2- or 4-(perfluoroheptylmethoxy)phenyl groups bonded through a thiourea linkage. These perfluoroalkyl-modified polyallylamines are referred to as 2-PAPEF-5 to 2-PAPEF-100 and 4-PAPEF-5 to 4 PAPEF 100, respectively, hereinbelow, the numerical figures at the end of each abridgment being the degree of modification in %. The modifications effected in the reaction conditions include some extension of the reaction time to complete the reaction when the intended degree of modification was 40% or higher. When the intended degree of modification was 80% or higher with the 2-isomer of the isothiocyanate compound, the polyallylamine solution in the solvent mixture of methyl alcohol and benzene was admixed with 2-(perfluoroheptylmethoxy)phenyl isothiocyanate and the solvents were removed by evaporation under a reduced pressure to dryness followed by the addition of a 10:1 mixture of benzene and trifluoroethyl alcohol and agitation of the solution for 24 hours at room temperature to effect the polymer reaction in this second solvent mixture.

The degree of modification in each of the above prepared modified polymers was confirmed by conducting chemical analysis for the content of fluorine. Thus, the values of the fluorine content obtained bY the chemical analysis and calculated from the proportion of the reactants used in the reaction were as follows, the latter values given in brackets, for the respective modified polymers. 4-PAPEF-5: 15.7% (17.1%); 4-PAPEF-20: 34.7% (34.8%); 4-PAPEF-40: 41.9% (42.2%); 4-PAPEF-60: 45.4% (45.3%); 4-PAPEF-80: 45.9% (46.9%); and 4-PAPEF-100: 48.0% (48.2%).

EXAMPLE 2.

Langmuir-Blodqett's films of the perfluoroalkyl-modified polyallylamines were prepared in the following manner. Thus, each of the perfluoroalkyl-modified polyallylamines prepared in Example 1 excepting the 2-PAPEF-5 was dissolved in a solvent mixture of trifluoroethyl alcohol and benzene to prepare a polymer solution in a concentration of 0.3 to $1.0 \times 10^{-3}$ moles/liter calculated for the perfluoroalkyl-containing pendant groups. The solvent mixture used for dissolving the 2-PAPEF- 5 was composed of methyl alcohol and benzene. The solution was dropped on and spread over a water surface and the surface pressure was determined according to the Langmuir-Bodgett's method as a function of the area occupied by a single molecule to prepare a so-called F-A isotherm. The results are shown in FIGS. 1 and 2. These graphs indicate that the intrinsic area, i.e. the area occupied by a single perfluoroalkyl group in the film, is 0.87, 0.56, 0.43, 0.37, 0.30 and 0.15 nm$^2$ for the 2-PAPEF-5, -20, -40, -60, -80 and -100, respectively, and 0.79, 0.46, 0.27 and 0.07 nm$^2$ for the 4-PAPEF-5, -20, -40 and -60, respectively. No definite intrinsic area could be obtained for the 4-PAPEF-80 and -100 but the values were 0.03 and 0.06 nm$^2$, respectively, when the surface pressure was about 20 mN·m$^{-1}$.

The ultra-thin film spread over the water surface was taken up on a glass plate at a surface pressure of 20 mN·m$^{-1}$ in the form of a monomolecular film and accumulated multilayered film. No uniform accumulated film could be obtained from the 4-PAPEF-20 and -40 because the film could not be taken up smoothly on the preceding film already on the glass plate in the second time and thereafter as is mentioned before. Further, no accumulated film could be obtained from the 4-PAPEF-80 and -100 because the first layer on the glass plate was peeled off from the glass plate when taking up of the second film was tried. Each of the LB films thus prepared had good tansparency.

EXAMPLE 3.

The contact angle of an n-alkane was determined on the monomolecular and accumulated LB films taken up on a glass plate in Example 2 and the value of the critical surface tension γc in dyn/cm obtained from the Zisman plot was calculated by the method of least squares to give the results shown in Table 1 below.

TABLE 1

| Modified Poly-allylamine | Monomolecular film | Five-fold accumulated film |
|---|---|---|
| 2-PAPEF-5 | 19.5 | 19.9 |
| 2-PAPEF-20 | 17.7 | 17.6 |
| 2-PAPEF-40 | 15.8 | 15.8 |
| 2-PAPEF-60 | 15.5 | 15.7 |
| 2-PAPEF-80 | 15.7 | 16.2 |
| 2-PAPEF-100 | 16.4 | 16.3 |
| 4-PAPEF-5 | 17.8 | 17.7 |
| 4-PAPEF-20 | 14.8 | 14.5* |
| 4-PAPEF-40 | 9.8 | 10.4* |
| 4-PAPEF-60 | 13.7 | 13.5 |

TABLE 1-continued

| Modified Poly-allylamine | Monomolecular film | Five-fold accumulated film |
| --- | --- | --- |
| 4-PAPEF-80 | 21.8 | —** |
| 4-PAPEF-100 | 20.1 | —** |

*The film was uneven in the second and subsequent layers.
**Five-fold accumulated film could not be obtained.

EXAMPLE 4.

The LB films prepared in Example 2 were subjected to the measurement of the film thickness in the following two ways.

Thus, a part of the LB film was peeled off from the substrate surface and the level difference between the area covered with the LB film thereon and the bare substrate surface after peeling of the LB film was determined by using a Talystep to give a result that the thickness of a sigle layer was 2.6–3.2 nm, 0.9–1.4 nm, 1.6–2.6 nm, 1.1–2.3 nm, 2.7–5.9 nm and 5.0–10.4 nm in the LB films of 2-PAPEF-5, -20, -40, -60, -80 and -100, respectively, and 1.4–1.7 nm and 6.0–10.3 nm in the LB films of 4-PAPEF-5 and -60, respectively.

Separately, each of the LB films was subjected to the X-ray diffractometry by using the Cu $K\alpha_1$ line of the wave-length of 0.154050 nm with an acceleration voltage of 40 kV and beam current of 30 mA to give a diffraction diagram from which the film thickness of the single layer was calculated by utilizing the Bragg's equation to give a value of about 3.7 nm, 1.9 nm, 1.8 nm, 1.9 nm, 3.7 nm and 5.8 nm for the LB films of 2-PAPEF-5, -20, -40, -60, -80 and -100, respectively, and 1.8 nm, 3.4 nm. 3.7 nm and 7.7 nm for the LB films of 4-PAPEF-5 -20 -40 and -60 respectively.

What is claimed is:

1. A fluorine-containing polymeric compound having a structure represented by the general formula

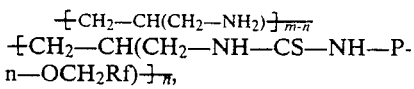

$-(CH_2-CH(CH_2-NH-CS-NH-P_n-OCH_2Rf))_{n}$, in which Rf is a perfluoroalkyl group having 6 to 15 carbon atoms, $P_n$ is a 1,2- or 1,4-phenylene group, m is a positive integer in the range from 10 to 1500, n is a positive integer not exceeding m.

2. The fluorine-containing polymeric compound as claimed in claim 1 wherein the perfluoroalkyl group denoted by Rf has 7 carbon atoms.

3. The fluorine-containing polymeric compound as claimed in claim 1 wherein the ratio of the subscript n to the subscript m is at least 0.05.

* * * * *